United States Patent [19]

Theodoras, II et al.

[11] Patent Number: 5,710,424
[45] Date of Patent: Jan. 20, 1998

[54] MULTIPLE FIELD OF VIEW DETECTOR WITH BACKGROUND CANCELLATION

[75] Inventors: James T. Theodoras, II, Ann Arbor; Salvatore F. Nati, Jr., Dexter, both of Mich.

[73] Assignee: Imra America, Inc., Ann Arbor, Mich.

[21] Appl. No.: 544,718

[22] Filed: Oct. 18, 1995

[51] Int. Cl.$^6$ ........................................ G01C 3/08
[52] U.S. Cl. ............................. 250/208.2; 250/559.38; 250/214 B; 356/5.03
[58] Field of Search ................. 250/208.2, 559.38, 250/214 R, 214 B; 180/169; 364/424.02; 356/5.01, 5.03, 5.05, 5.07, 5.08; 327/72, 74

[56] References Cited

U.S. PATENT DOCUMENTS

| | | | |
|---|---|---|---|
| 3,885,872 | 5/1975 | Howe, Jr. et al. | 356/4 |
| 4,049,961 | 9/1977 | Marcy | 250/202 |
| 4,333,147 | 6/1982 | Regueiro et al. | 364/436 |
| 4,630,109 | 12/1986 | Barton | 358/103 |
| 4,926,170 | 5/1990 | Beggs et al. | 340/904 |
| 5,302,835 | 4/1994 | Bendett et al. | 250/561 |
| 5,343,032 | 8/1994 | Chirovsky et al. | 250/208.2 |
| 5,347,456 | 9/1994 | Zhang et al. | 364/424.02 |

*Primary Examiner*—Edward P. Westin
*Assistant Examiner*—Alan L. Giles
*Attorney, Agent, or Firm*—Burns, Doane, Swecker & Mathis, LLP

[57] ABSTRACT

The present invention relates to an apparatus and a method for detecting pulses of light energy from at least two fields of view. A first detector having a first bias detects a pulse received at a first point in time. A second detector having a second bias, different from the first bias, detects a pulse received at a second point in time. A processor compares an output of the first detector with a first threshold to produce a signal representing receipt of a pulse from a first field of view. The processor also compares an output of the second detector with a second threshold, different from the first threshold, to produce a signal representing receipt of a pulse from a second field of view. Because the detectors are biased with different biases, the detected pulses are easily distinguished. Thus, multiple fields of view can be detected without complex hardware. The detectors can be biased with opposite polarities so that background noise is cancelled out. In a system and method for detecting pulses of light energy from at least two fields of view, a transmitter transmits pulses of light energy into a first field of view and into a second field of view. A single transmitter can be used to emit signals towards multiple fields of view. Thus, the transmitter only has to emit signals once for multiple samples, increasing the number of samples that can be taken per sample period.

20 Claims, 5 Drawing Sheets

5,710,424

MULTIPLE FIELD OF VIEW DETECTOR WITH BACKGROUND CANCELLATION

BACKGROUND OF THE INVENTION

1. Field of the Invention

The present invention relates to a system, an apparatus and a method for detecting pulses of energy. More particularly, the present invention relates to an electronic system and method for detecting pulses of light energy for use in a closed loop system.

2. State of the Art

Light energy pulse detection systems are used for a variety of applications including scanners, automobile guidance systems, and so forth. An example of a vehicle guidance system is disclosed in a copending application entitled "Automated Vehicle Guidance System and Method for Automatically Guiding a Vehicle", filed Jul. 17, 1995, assigned Ser. No. 08/503,049 herein incorporated by reference.

In a light energy pulse detection system, it is often necessary to monitor multiple fields of view representing predetermined areas having fixed spatial relationships to the light detection system. For example, in a vehicle guidance system, multiple fields of view are monitored to determine the orientation of the vehicle. A traditional approach for monitoring multiple fields of view is to detect multiple pulses of relatively low power light energy.

There are many optoelectronic systems currently available on the market which are capable of monitoring multiple fields of view. These systems employ a variety of light detection devices to detect multiple fields of view.

One approach for detecting multiple fields of view employs optical multiplexing. FIG. 1 depicts a conventional device for detecting light energy using optical multiplexing. Referring to FIG. 1, an array of light detectors 100 and 110 have their anodes connected to a common node 120. Light energy pulses from the first field of view, FOV #1, are detected at the detector 100, and light energy pulses from the second field of view, FOV #2, are detected at the detector 110. Both detectors are biased with the same bias, labelled "+Vbias."

The common node 120 is connected to the input of an electronic processor circuit 130 which comprises a transimpedance preamplifier 140 including a feedback resistor Rf and an operational amplifier TZ for preamplifying and converting current signals into a voltage signal. The electronic processor 130 further comprises an amplifier 150 for amplifying the voltage signal, and a comparator 160 for comparing the voltage signal to a predetermined threshold, labelled "+Vthreshold", and outputting signals representing FOV #1 and FOV #2.

A pulse of light energy incident on either detector 100 or 110 (or both of detectors 100 and 110) will result in a pulse output to the electronic processor circuit. In order to determine which detector produced the pulse output, the light pulses produced by the detectors must be multiplexed in time. Thus, the system is configured such that detector 100 detects pulses transmitted at time t1, and detector 110 detects pulses transmitted at time t2. Two transmitters are needed to perform this optical multiplexing, thereby adding to overall system complexity. Also, both detectors 100 and 110 will detect an equal amount of background light comprising, e.g., solar energy. Thus, the amount of background light detected is doubled, resulting in a large noise signal.

Another approach for detecting multiple fields of view is to employ electronic multiplexing. FIG. 2 illustrates a conventional device for detecting light energy using electronic multiplexing. In FIG. 2, detectors 200 and 210 are used to detect separate ones of multiple fields of view, FOV #1 and FOV #2. Signals from the detectors 200 and 210 are input to an electronic processor 230 at nodes 220 and 225, respectively. The electronic processor 230 includes multiple transimpedance preamplifiers 240 and 242, which include feedback resistors $Rf_1$ and $Rf_2$ and operational amplifiers $TZ_1$ and $TZ_2$, respectively.

The outputs of the transimpedance preamplifiers 240 and 242 are multiplexed by an electronic multiplexer 245 in response to a signal FOV Select. The output of the multiplexer 245 is amplified in amplifier 250 and then compared with a voltage +Vthreshold in a comparator 260.

The FIG. 2 device is not as susceptible to background light as the device illustrated in FIG. 1. However, background light is not eliminated and can still cause detection errors. Also, the FIG. 2 device requires duplication of hardware, thereby adding to system complexity. Further, because multiplexing is used to determine which field of view produces an output pulse, only one field of view can be monitored per sample period.

There is thus a need for a simple, inexpensive system for monitoring multiple fields of view. Such a system would ideally require only one set of receiver electronics, be immune to background light, and monitor multiple fields of view in a single sample period.

SUMMARY OF THE INVENTION

Accordingly, the present invention is directed to an apparatus and method for detecting pulses of relatively low power light energy from at least two fields of view. A first detector having a first bias is provided for detecting a pulse received at a first point in time, and a second detector having a second bias, different from the first bias, is provided for detecting a pulse received at a second point in time. A processor is provided for comparing an output of the first detector with a first threshold to produce a signal representing receipt of a pulse from a first field of view, and for comparing an output of the second detector with a second threshold, different from the first threshold, to produce a signal representing receipt of a pulse from a second field of view.

According to another exemplary embodiment of the present invention, a system and a method are provided for detecting pulses of light energy from at least two fields of view. A transmitter is provided for transmitting pulses of light energy into a first field of view and into a second field of view. A first detector having a first bias is provided for detecting a pulse received at a first point in time, and a second detector having a second bias, different from the first bias, is provided for detecting a pulse received at a second point in time. A processor is provided for comparing an output of the first detector with a first threshold to produce a signal representing receipt of a pulse from the first field of view, and for comparing an output of the second detector with a second threshold, different from the first threshold, to produce a signal representing receipt of a pulse from the second field of view.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 1:
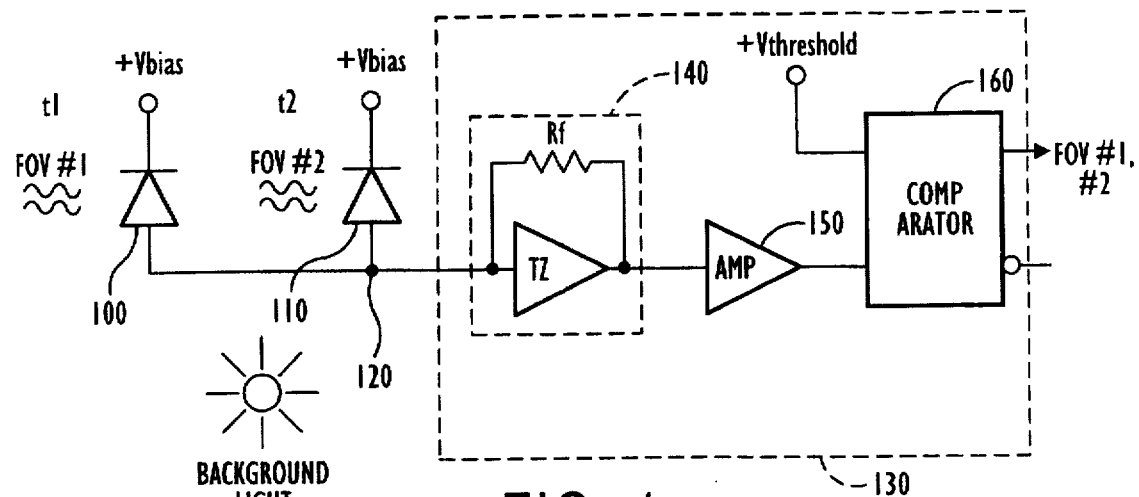
FIG. 1 depicts a conventional apparatus for detecting pulses using optical multiplexing.
Figure 2:
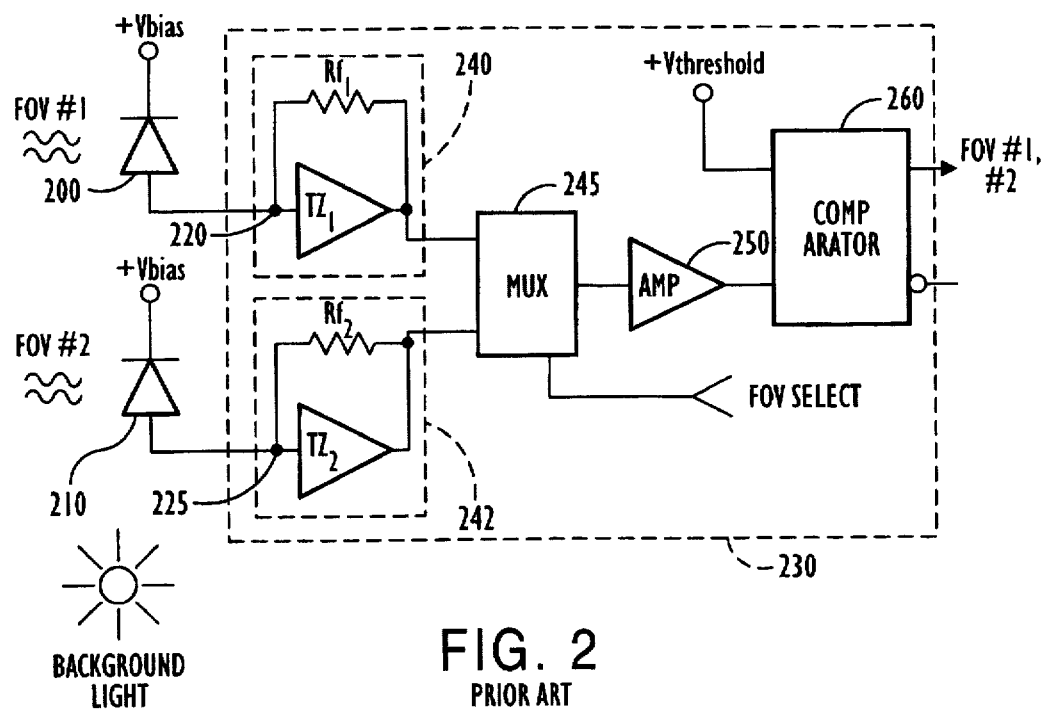
FIG. 2 depicts a conventional apparatus for detecting light pulses using electronic multiplexing.
Figure 3:
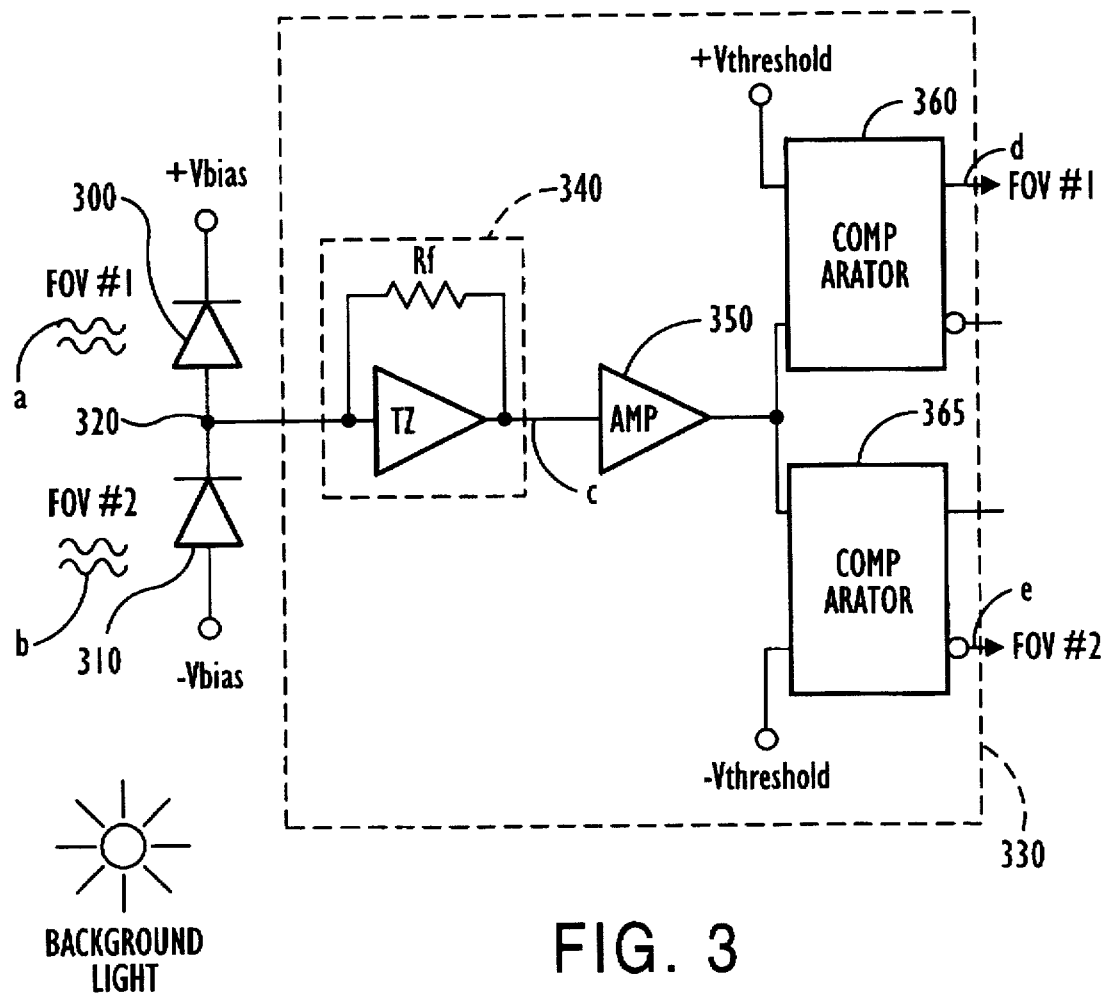
FIG. 3 depicts an exemplary apparatus for detecting light pulses according to the present invention.

FIG. 3 depicts an exemplary apparatus for detecting relatively low power light pulses from at least two fields of view according to a first embodiment of the present invention. Referring to FIG. 3, the apparatus comprises a first detector, such as a pin diode 300, having a first bias for detecting a pulse received at a first point in time. The apparatus also comprises a second detector, such as a pin diode 310, having a second bias, different from the first bias, for detecting a pulse received at a second point in time. The apparatus further comprises a processor, such as an electronic processor 330, for comparing an output of the diode 300 with a first threshold to produce a signal representing receipt of a pulse from a first field of view, FOV #1, and for comparing an output of the diode 310 with a second threshold, different from the first threshold, to produce a signal representing receipt of a pulse from a second field of view.

The diodes 300 and 310 are biased with a first bias and second bias, respectively; for example voltages of equal amplitude with opposite polarities. As shown in FIG. 3, for example, the diode 300 is biased with a positive voltage +Vbias, and the diode 310 is biased with a negative voltage, –Vbias. Thus, light impinging upon the diode 300 will create a positive polarity pulse, and light impinging upon the diode 310 will create a negative polarity pulse. Alternately, the diodes 300 and 310 can be biased with voltages of the same polarity but different amplitudes.

According to the exemplary embodiment illustrated in FIG. 3, the diodes 300 and 310 can be connected in series, "anode-to-cathode" at a node 320. That is, the anode of diode 300 can be connected in series with the cathode of diode 310 at the node 320. Thus, one diode acts as a current sink, while the other diode acts as a current source. The resulting signal at node 320 is a bipolar current signal in which noise has been cancelled. The bipolar current signal at node 320 is input into the electronic processor 330.

The exemplary processor 330 includes a transimpedance amplifier 340, an amplifier 350, a first comparator 360, and a second comparator 365. The transimpedance amplifier 340 includes a feedback resistor Rf and a conventional operational amplifier TZ. The transimpedance amplifier 340 preamplifies and converts the bipolar current signal into a voltage signal. The voltage output of the transimpedance amplifier 340 is amplified by an additional, conventional amplifier 350 (for example, digital amplifier or analog operational amplifier) if more gain is desired. An amplified output of the amplifier 350 is input into the comparators 360 and 365.

The comparators 360 and 365 are set at different thresholds. For example, a positive threshold, +Vthreshold, is set on comparator 360 and a negative threshold, –Vthreshold, is set on comparator 365. A "true" output from the comparator 360 is used as a FOV #1 output, and a "complement" output from the comparator 365 is used as an FOV #2 output. Thus, two independent digital signals are output, one signal representing all light pulse events in one field of view, FOV #1, and a second signal representing all light pulse events in a second field of view, FOV #2.

The exemplary embodiment depicted in FIG. 3 can be implemented as two discrete packaged detectors connected to a single discrete packaged transimpedance integrated circuit. Alternately, the detectors and the transimpedance amplifier can be integrated onto a common substrate. The first and second detectors can be implemented with any conventional pin diodes, including, for example, Hamamatsu Photonics S3399. Alternately, the first and second detectors can be any light detecting devices, for example, any photosensitive devices such as phototransistors. The transimpedance amplifier 340 can be implemented with conventional circuitry, such as a Phillips SA5222 amplifier, and the amplifier 350 can be implemented with any conventional amplifier having the desired gain for a given circuit configuration. The comparators 360 and 365 can be formed as a conventional dual comparator, a window comparator or as separate comparators.

Figure 4A:
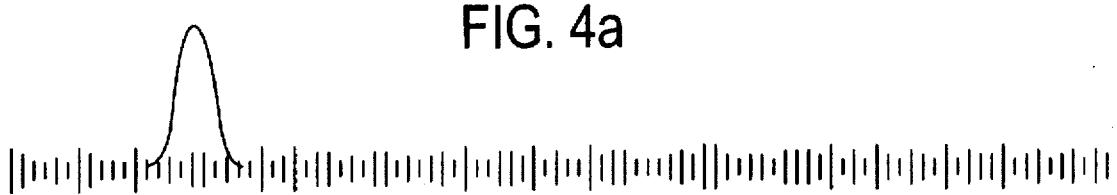
FIGS. 4a–4e graphically represent pulses travelling through the exemplary apparatus depicted in FIG. 3.
Figure 4B:
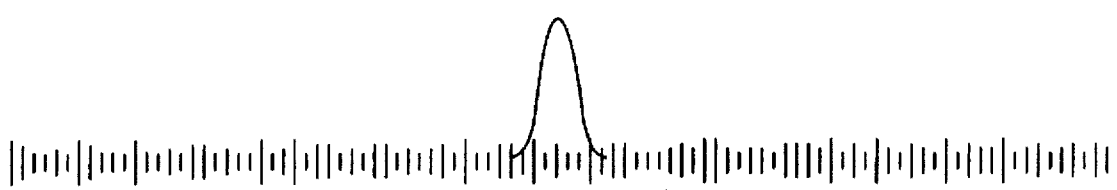

FIGS. 4a–4e graphically illustrate pulses travelling through the exemplary apparatus depicted in FIG. 3. FIG. 4a illustrates a typical, exemplary waveform for a pulse of light energy, represented by a solid line "a", detected, for example, at the diode 300. In practice, the light pulses can assume any shape. FIG. 4b illustrates a similar pulse of light, also represented by a solid line "b", occurring later in time, and detected for example at the diode 310. The pulses depicted in FIGS. 4a and 4b, having arrived from two different fields of view, are received at different times independent of one another. Both pulses contain noise or background light, represented graphically by unconnected vertical lines. Of course, those skilled in the art will appreciate that in actuality, the noise would be superposed on the pulses of light energy.

Figure 4C:
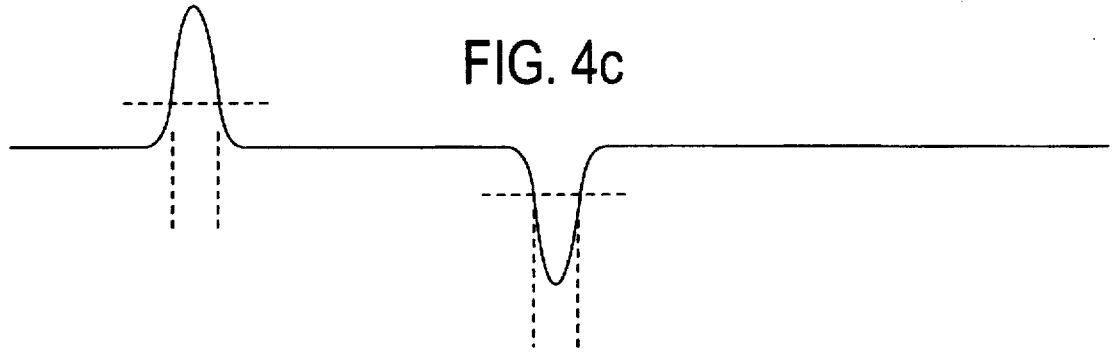

An exemplary input to or an output "c" from the transimpedance amplifier 340 in FIG. 3 is depicted in FIG. 4c as a bipolar signal. Referring to FIG. 4c, the positive portion of the waveform represents signals from one field of view, e.g., FOV #1, and the negative portion of the waveform represents signals from another field of view, e.g., FOV #2. As shown in FIG. 4c, the background light or noise is cancelled due to the biasing of the pin diodes with opposite polarities.

Figure 4D:
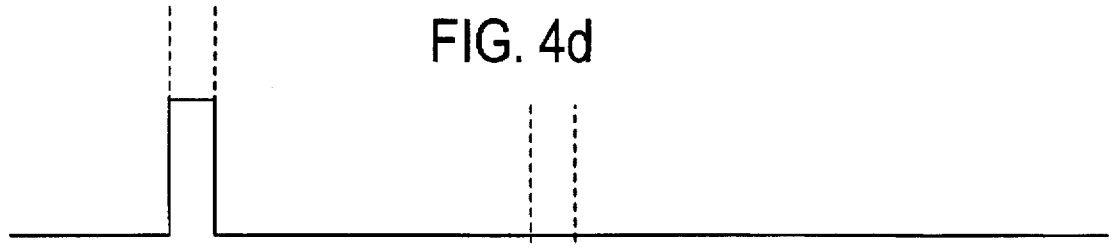
Figure 4E:
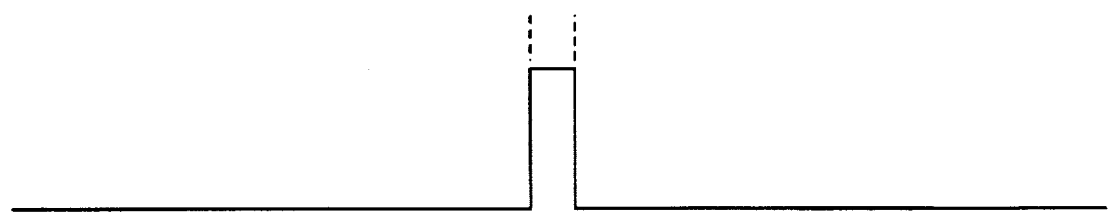

FIGS. 4d and 4e illustrate exemplary waveforms output from the FIG. 3 comparators 360 and 365, respectively. As shown in FIGS. 4d and 4e, the output "d" of the FIG. 3 comparator 360 is a signal representing all light pulse events from one field of view, e.g., FOV #1, and the output "e" of comparator 365 in FIG. 3 is an inverted signal representing all light pulse events from another field of view, e.g., FOV #2. The comparator outputs are shown as square wave pulses, but can, of course, assume any of a variety of shapes readily apparent to those skilled in the art.

Figure 5:
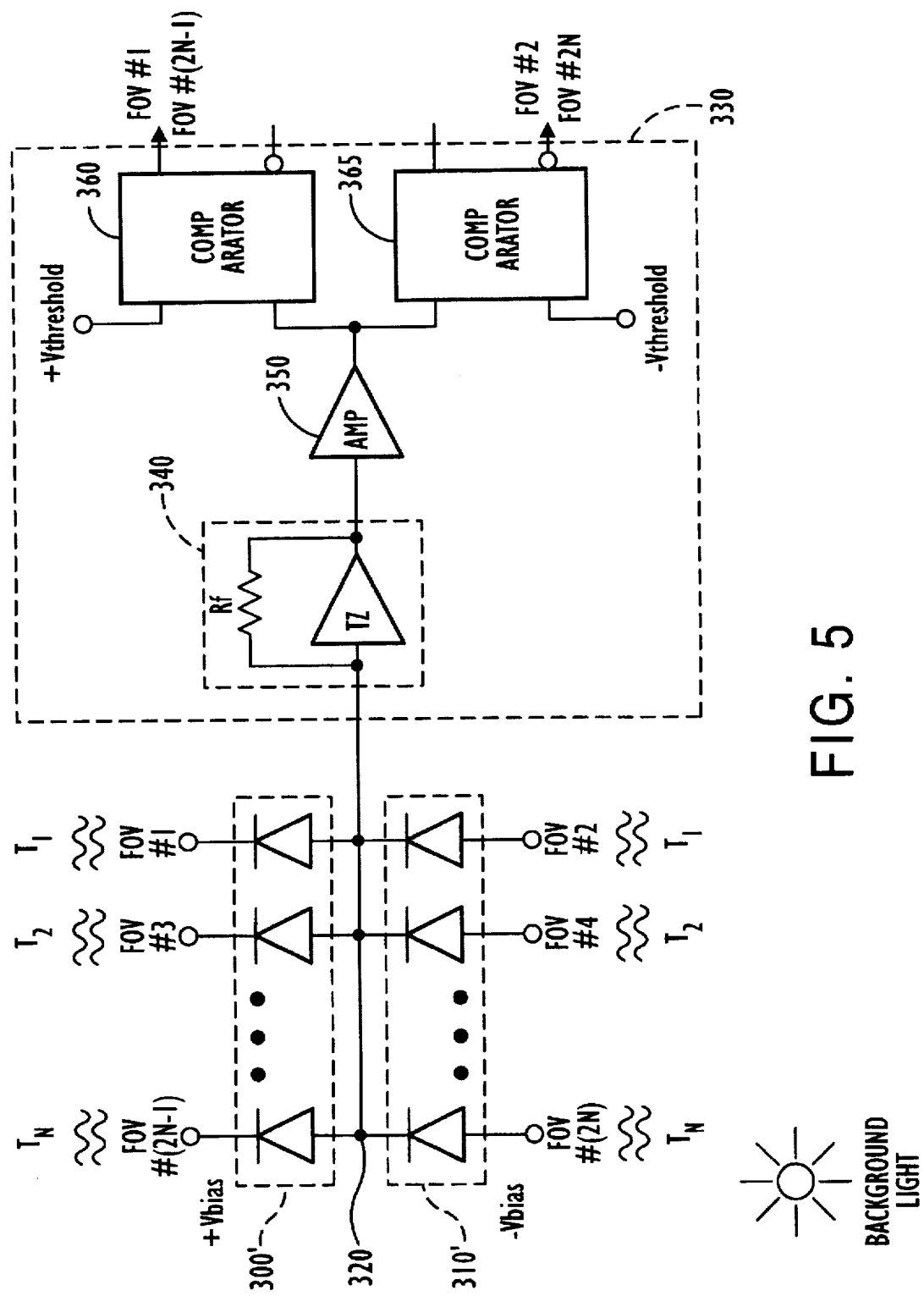
FIG. 5 depicts an alternate embodiment of the exemplary apparatus depicted in FIG. 3.

FIG. 5 depicts an alternate exemplary embodiment of the apparatus depicted in FIG. 3 for detecting more than two fields of view. Referring to FIG. 5, pulses from multiple fields of view represented by FOV #1 . . . FOV #(2N) are received at multiple points in time, T1 . . . T2N, where N can, for example, be a positive, non-zero integer. The pulses from the multiple fields of view FOV #1 . . . FOV #(2N) can be detected using a first detector, such as any one or more of N positively biased diodes 300', and a second detector, such as any one or more of N negatively biased diodes 310'. The outputs of the detectors are processed, for example by the processor 330, in a manner similar to that described with respect to FIG. 3, to produce signals representing all the light pulse events from the multiple fields of view, FOV #1 ... FOV #(2N−1) for odd-numbered fields and FOV #2 ... FOV #(2N) for even-numbered fields. The pulses from the multiple fields of view can be distinguished by keeping track of the number of pulses produced at the output of the comparator 360 (for example, using a counter that is reset after counting N pulses), and, in similar fashion, at the output of the comparator 365. Thus, the outputs from any one or more fields of view can be selectively monitored.

Figure 6:
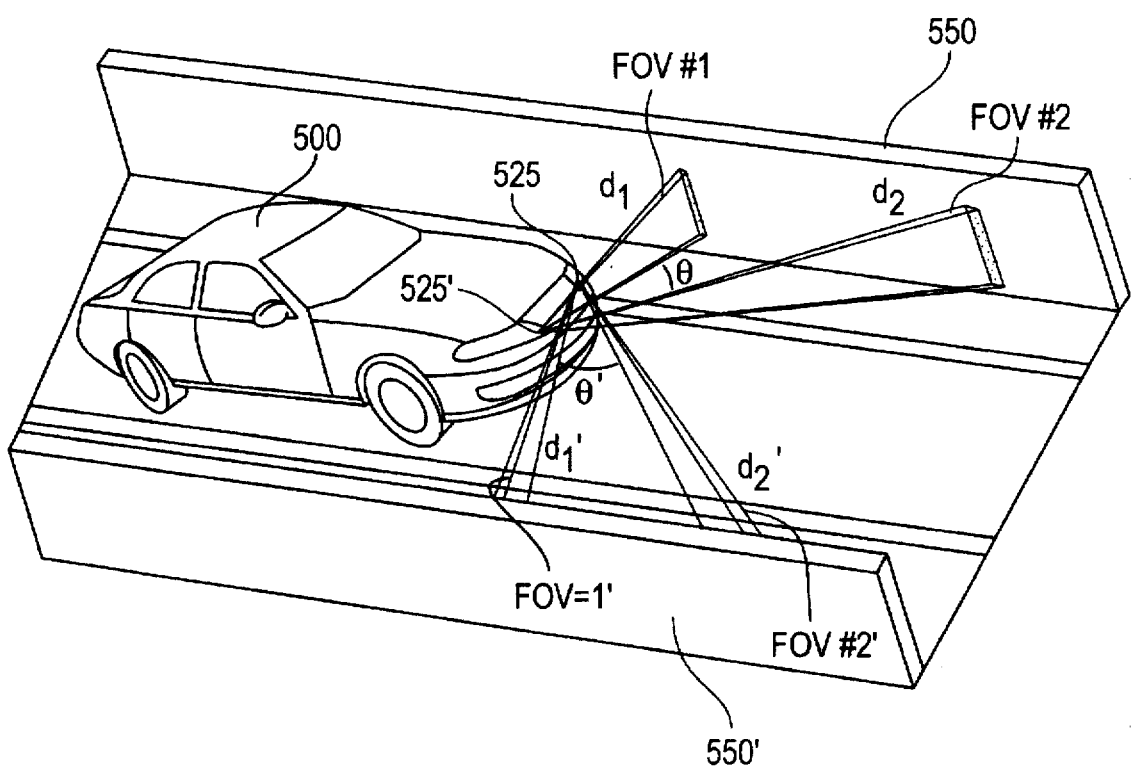
FIG. 6 depicts an exemplary system for detecting light pulses according to the present invention.

FIG. 6 depicts an exemplary system for detecting light pulses according to the present invention. Referring to FIG. 6, the system comprises a transmitter implemented, for example, in a transceiver 525, for transmitting pulses of light energy into a first field of view, e.g., FOV #1, and into a second field of view, e.g., FOV #2. The transceiver 525 can be implemented, for example, as a low power laser attached to a vehicle 500 for producing a wide beam or for producing narrow split beams.

The system further comprises a first detector, a second detector, and a processor, such as those described above with regard to FIG. 3. The first detector, the second detector and the processor can be implemented, for example, in the transceiver 525 of FIG. 6. Alternately, the first detector, the second detector, and the processor can be implemented as a separate receiver, or the components can be separated in any desired fashion.

Referring to FIG. 6, the transceiver 525 emits pulses of light energy into FOV #1 and FOV #2. FOV #2 is offset from FOV #1 by, for example, an angle θ.

The pulses of light energy are reflected toward the transceiver 525 from a barrier 550. The transceiver 525 detects the pulses from FOV #1 and FOV #2. If the offset angle θ is zero, the pulses from the two fields of view will be detected at the same time and will cancel each other out. In practice, as long as there are two distinct fields of view, the offset angle θ is not zero, so the light pulses will be detected by the transceiver 525 at different times, resulting in receipt of distinguishable signals from the two fields of view, FOV #1 and FOV #2. Using these signals, a time-of-flight measurement can be taken, distances d1 and d2 for the vehicle 500 to the barrier 550 can be calculated, and the orientation of the vehicle with respect to the barrier 550 can be determined using known techniques.

As shown in FIG. 6, an additional transceiver 525' can be attached to the vehicle 500 to detect pulses of light energy from the fields of view FOV #1' and FOV #2', offset from one another by an exemplary angle θ'. Signals reflected from the barrier 550' are detected and used to determine signals representing these fields of view. Using these signals, the distances d1' and d2' can be calculated, and the orientation of the vehicle with respect to the barrier 550' can be determined, using known techniques. Such an operation can be repeated using a number of different fields of view.

According to the present invention, because the detectors are biased with different biases, detected pulses are easily distinguished. Thus, multiple fields of view can be detected without complex hardware. Further, because the biases have opposite polarities, background noise is cancelled. Also, a single transmitter can be used to emit signals into multiple fields of view. Thus, in exemplary embodiments, the transmitter only has to emit signals once for multiple samples, increasing the number of samples that can be taken per sample period.

Those skilled in the art will appreciate that the foregoing exemplary embodiments are by way of sample only. For example, any number of fields of view and of associated detectors can be used. Further, any analog and/or digital circuitry can be used to process the reflected pulses of energy. While light energy has been described, those skilled in the art will appreciate that any energy which can be emitted in pulse form such that reflections can be accurately and reliably detected, including light energy in both the humanly visible and humanly non-visible spectrum, can be used. In addition, features of the present invention are not limited to use for vehicle guidance, but, rather, can be used for any appropriate application, including any form of object detection. Further, although only detectors biased with different polarities have been described, multiple detectors with different amplitudes and polarities can be used to detect multiple fields of view.

Thus, it will be appreciated by those skilled in the art that the present invention can be embodied in other specific forms without departing from the spirit or essential thereof. The presently disclosed embodiments are therefore considered in all respects to be illustrative and not restricted. The scope the invention is indicated by the appended claims rather than the fore description and all changes that come within the meaning and range and equivalence thereof are intended to be embraced therein.

What is claimed:

1. An apparatus for detecting pulses of light energy from at least two fields of view comprising:

a first detector having a first bias for detecting a pulse received at a first point in time;

a second detector having a second bias, different from said first bias, for detecting a pulse received at a second point in time and a processor for comparing an output of the first detector with a first threshold to produce a signal representing receipt of a pulse from a first field of view, and for comparing an output of the second detector with a second threshold, different from said first threshold, to produce a signal representing receipt of a pulse from a second field of view;

wherein said first bias is of an opposite polarity relative to said second bias.

2. The apparatus of claim 1, wherein the first detector and the second detector are photosensitive devices.

3. The apparatus of claim 1, wherein each of said first and second detectors further includes:

multiple diodes for detecting pulses of light energy from more than two fields of view at multiple points in time.

4. The apparatus of claim 1, wherein the first detector and the second detector are pin diodes connected in series.

5. The apparatus of claim 1, wherein the processor comprises a first comparator and a second comparator.

6. A method for detecting pulses of light energy from at least two fields of view comprising the steps of:

detecting with a first bias a pulse received at a first point in time;

detecting with a second bias, different from said first bias, a pulse received at a second point in time;

comparing a pulse detected with said first bias with a first threshold to produce a signal representing receipt of a pulse from a first field of view; and comparing a pulse detected with said second bias with a second threshold, different from said first threshold, to produce a signal representing receipt of a pulse from a second field of view;

wherein said first bias is of an opposite polarity relative to said second bias.

7. The method of claim 6, wherein the steps of detecting are performed with photosensitive devices.

8. The method of claim 6, wherein each of said steps of detecting further includes a step of:

detecting pulses of light energy from more than two fields of view at multiple points in time.

9. The method of claim 6, wherein the steps of detecting are performed with first and second pin diodes connected in series.

10. The method of claim 6, wherein the steps of comparing are performed by a first comparator and a second comparator.

11. A system for detecting pulses of light energy from at least two fields of view comprising:

a transmitter for transmitting pulses of light energy into a first field of view and into a second field of view;

a first detector having a first bias for detecting a pulse received at a first point in time;

a second detector having a second bias, different from said first bias, for detecting a pulse received at a second point in time; and a processor for comparing an output of the first detector with a first threshold to produce a signal representing receipt of a pulse from said first field of view, and for comparing an output of the second detector with a second threshold, different from said first threshold, to produce a signal representing receipt of a pulse from said second field of view;

where said first bias is of an opposite polarity relative to said second bias.

12. The system of claim 11, wherein the first detector and the second detector are photosensitive devices.

13. The system of claim 11, wherein each of said first and second detectors further includes:

multiple diodes for detecting pulse of light energy from more than two field of view at multiple points in time.

14. The system of claim 11, wherein the first detector and the second detector are pin diodes connected in series.

15. The system claim 11, wherein the processor comprises a first comparator and a second comparator.

16. A method for detecting pulses of light energy from at least two fields of view comprising the steps of:

transmitting pulses of light energy into a first field of view and into a second field of view;

detecting with a first bias a pulse received at a first point in time;

detecting with a second bias, different from said first bias, a pulse received at a second point in time;

comparing a pulse detected with said first bias with a first threshold to produce a signal representing receipt of a pulse from a first field of view; and comparing a pulse detected with said second bias with a second threshold, different from said first threshold, to produce a signal representing receipt of a pulse from a second field of view;

wherein said first bias is of an opposite polarity relative to said second bias.

17. The method claim 16, wherein the steps of detecting are performed with photosensitive devices.

18. The method of claim 16, wherein each of said steps of detecting further includes a step of:

detecting pulses of light energy from more than two fields of view at multiple points in time.

19. The method claim 16, wherein the steps of detecting are performed with first and pin diodes connected in series.

20. The method claim 16, wherein the steps of comparing are performed by a first and a second comparator.

* * * * *